(12) United States Patent
Hiramatsu

(10) Patent No.: US 6,798,926 B2
(45) Date of Patent: Sep. 28, 2004

(54) SYSTEM AND METHOD OF POINTED POSITION DETECTION, PRESENTATION SYSTEM, AND PROGRAM

(75) Inventor: Kazunori Hiramatsu, Okaya (JP)

(73) Assignee: Seiko Epson Corporation, Tokyo (JP)

(*) Notice: Subject to any disclaimer, the term of this patent is extended or adjusted under 35 U.S.C. 154(b) by 572 days.

(21) Appl. No.: 09/788,605

(22) Filed: Feb. 21, 2001

(65) Prior Publication Data

US 2001/0026645 A1 Oct. 4, 2001

(30) Foreign Application Priority Data

Feb. 22, 2000 (JP) ........................ 2000-043782

(51) Int. Cl.[7] .................. G06K 9/36; G06K 11/06; G09G 3/22; H04N 5/232
(52) U.S. Cl. .................... 382/291; 345/183; 178/18.01; 348/211.99
(58) Field of Search ................ 382/181, 254, 382/255, 260, 291, 293, 299, 312, 313; 345/2.2, 156, 157, 661, 705, 175, 180, 182, 183; 348/207.99, 211.99, 220.1, 221.1; 356/614; 178/18.01, 19.05

(56) References Cited

U.S. PATENT DOCUMENTS

| | | | |
|---|---|---|---|
| 5,504,501 A | | 4/1996 | Hauck et al. |
| 5,515,079 A | | 5/1996 | Hauck |
| 5,572,251 A | * | 11/1996 | Ogawa .................. 348/207.99 |
| 5,687,333 A | * | 11/1997 | Dobashi et al. ............. 345/705 |
| 5,726,701 A | * | 3/1998 | Needham .................... 725/105 |
| 5,736,968 A | * | 4/1998 | Tsakiris ...................... 345/2.2 |
| 5,815,160 A | * | 9/1998 | Kikuchi et al. ............. 345/661 |
| 5,914,783 A | * | 6/1999 | Barrus ........................ 356/614 |
| 6,292,171 B1 | * | 9/2001 | Fu et al. ..................... 345/156 |

FOREIGN PATENT DOCUMENTS

| | | |
|---|---|---|
| JP | 5-224636 | 3/1993 |
| JP | A 6-35607 | 2/1994 |
| JP | A 9-204262 | 8/1997 |
| JP | A 9-222951 | 8/1997 |
| JP | A 10-83246 | 3/1998 |
| JP | 11-345085 | 12/1999 |

OTHER PUBLICATIONS

U.S. patent application Ser. No. 09/778,740, filed Feb. 8, 2001.

U.S. patent application Ser. No. 09/788,578, filed Feb. 21, 2001.

* cited by examiner

Primary Examiner—Kanji Patel
(74) Attorney, Agent, or Firm—Oliff & Berridge, PLC

(57) ABSTRACT

A system and method of pointed position detection, a presentation system, and a program that make it possible to detect a pointed position accurately. The system of the present invention which detects a position of a light spot that has been projected into an image display region by using an infrared pointer comprises: a CCD camera that picks up an image of this image display region; a pointing coordinate detection section that is position detection means which detects a pointed position of the light spot within the image display region; and a receiver section which receive a state signal that is transmitted from the infrared pointer during a pointer operation by that infrared pointer. The pointing coordinate detection section detects a position of the light spot as the pointed position on the image display region, based on the reception timing of the state signal.

19 Claims, 7 Drawing Sheets

SYSTEM AND METHOD OF POINTED POSITION DETECTION, PRESENTATION SYSTEM, AND PROGRAM

BACKGROUND OF THE INVENTION

1. Field of the Invention

The present invention relates to a system and method of pointed position detection, a presentation system, and also a program.

2. Description of Related Art

There are systems that enable presentations in which a pointer implement is used to project a light spot onto a screen.

With such a system, erroneous recognition can occur during the extraction of the light spot from an image signal of an image pick-up means when infrared light is used as the light spot, due to the surrounding environment, more specifically, due to external light such as an infrared remote controller signal used for controlling the projector or sunlight intruding from the exterior.

SUMMARY OF THE INVENTION

The present invention was devised in the light of the above described technical problem and has as an objective thereof the provision of a system and method of pointed position detection, a presentation system, and also a program that make it possible to detect a position accurately without any recognition errors, when it comes to detecting the position of a light spot that has been projected onto a screen or the like, from an image signal of an image pick-up means.

(1) In order to solve the above described technical problem, there is provided a pointed position detection system in accordance with the present invention which detects a position of a light spot that is projected into an image display region by using a pointer implement, the pointed position detection system comprising:

image pick-up means which picks up an image of the image display region;

position detection means which detects a pointed position of the light spot within the picked-up image display region; and receiver means which receives a state signal transmitted in from the pointer implement during a pointing operation performed by the pointer implement;

wherein the position detection means detects a position of the light spot as a pointed position in the image display region, based on reception timing of the state signal.

(2) According to the present invention, there is provided a pointed position detection system which detects a position of a light spot that is projected into an image display region by using a pointer implement, the pointed position detection system comprising:

image pick-up section which picks up an image of the image display region;

position detection section which detects a pointed position of the light spot within the picked-up image display region; and receiver section which receives a state signal transmitted in from the pointer implement during a pointing operation performed by the pointer implement;

wherein the position detection section detects a position of the light spot as a pointed position in the image display region, based on reception timing of the state signal.

(3) According to the present invention, there is provided a program embodied on an information storage medium or in a carrier wave for detecting a position of a light spot that is projected into an image display region by using a pointer implement, the program implementing in a computer:

position detection means which detects a pointed position of the light spot within the image display region, based on an image signal from an image pick-up means which picks up an image of the image display region; and means for causing a receiver means to receive a state signal that is transmitted in from the pointer implement during a pointing operation performed by the pointer implement;

wherein the position detection means detects a position of the light spot as a pointed position in the image display region, based on reception timing of the state signal.

(4) According to the present invention, there is provided a pointed position detection method of detecting a position of a light spot that is projected into an image display region by using a pointer implement, the method comprising:

an image picking-up step of picking up an image of the image display region;

a position detection step of detecting a pointed position of the light spot within the picked-up image display region; and a reception step of receiving a state signal transmitted in from the pointer implement during a pointing operation performed by the pointer implement;

wherein the position detection step detects a position of the light spot as a pointed position in the image display region, based on reception timing of the state signal.

In addition to enabling detection of the position of the light spot by image processing based on the imaging result, the present invention makes it possible to detect the pointed position from consideration of timing that is indicated by the pointer implement in practice by using the state signal, thus enabling a reduction in erroneous recognition due to external light such as sunlight or from a remote controller that also uses infrared light, which enables an increase in the reliability of pointed position detection.

(5) In each of the pointed position detection system and program, the position detection means may perform correction calculations in the detection of the pointed position, based on pointed position data for a plurality of frames.

(6) The position detection step may perform correction calculations in the detection of the pointed position, based on pointed position data for a plurality of frames.

The precision of position detection is generally determined by the frame rate and it is difficult to detect the pointed position at an interval that is shorter than a sampling interval of the image pick-up means. The employment of a configuration that performs correction calculations ensures a higher detection precision, because the correction calculations ensure that the detection of the true pointed position is based on sampling points before and after the time of the actual pointing operation, even when the pointing is done at a timing that does not match the sampling timing.

Note that various methods could be applied to these correction calculations, such as linear interpolation or curve interpolation.

(7) In each of the pointed position detection system and program, the position detection means may perform correction calculations in the detection of the pointed position that are based on delay time data which indicates a delay time comprising at least one of a processing delay time and a transfer delay time up until the detection of the state signal.

(8) The position detection step may perform correction calculations in the detection of the pointed position that are based on delay time data which indicates a delay time comprising at least one of a processing delay time and a transfer delay time up until the detection of the state signal.

This aspect of the invention ensures accurate position detection, by correction calculations that take into consideration any delay between the time at which the operating section is actually operated and the time at which the state signal is received.

(9) In each of the pointed position detection system, pointed position detection method, and program, the pointer implement may comprise:

light spot projection means which projects the light spot when a predetermined operating section is operated; and transmitter means which transmits the state signal in synchronization with the projection of the light spot.

Since this aspect of the invention makes it possible to use a common operating section, such as a switch, to project the light spot and also send a state signal at substantially the same time, it enables the operator to use the system with a minimum of effort, in comparison with a device that is provided with an operating section for the light spot and a separate operating section for the state signal.

(10) In this pointed position detection system, the state signal may comprise an identification signal for the pointer implement; and the pointed position detection system may further comprise identification means which identifies the pointer implement, based on the identification signal for the pointer implement.

(11) In the program of the invention, the state signal may comprise an identification signal for the pointer implement; and the program may further implement in a computer, identification means which identifies the pointer implement, based on the identification signal for the pointer implement.

This aspect of the invention enables a wide range of different types of presentation because it makes it possible to identify each pointer implement, even if one person is using a plurality of pointer implements or two or more people are using a plurality of pointer implements.

(12) In each of the pointed position detection system and program, the transmitter means may transmit the state signal in a wireless fashion; and the receiver means may receive the state signal in a wireless fashion.

This aspect of the invention makes it easier for the operator to use the system because the use of wireless means to transfer the state signal removes the need for any cables or the like for transferring signals.

(13) The program may further implement in a computer:

means for causing an image display means to display an image in the image display region; and processing means which performs processing in which a pointed position detected by the position detection means is reflected in predetermined data processing.

This aspect of the invention makes it possible to perform various types of processing.

(14) According to the present invention, there is provided a presentation system for performing a presentation in which a light spot is projected by a pointer implement into an image display region, the presentation system comprising:

display means which displays an image in the image display region;

the above-described pointed position detection system; and processing means which performs processing in which a pointed position detected by the position detection means is reflected in predetermined data processing.

In addition to enabling detection of the position of the light spot by image processing based on the imaging result, the present invention makes it possible to detect the pointed position from consideration of timing that is indicated by the pointer implement in practice by using the state signal, thus enabling a reduction in erroneous recognition due to external light such as sunlight or from a remote controller that also uses infrared light, which enables an increase in the reliability of pointed position detection. This enables the presenter to give the presentation while indicating the images in comfort, with no erroneous recognition of the pointed position.

Note that the data processing could also be applied to calculation of the cursor display position, changes in the display of the cursor, icon pointing determination processing, or icon display modification, by way of example.

(15) In each of the presentation system and program, the processing means may perform position control of a cursor comprised within the display image, based on the detected pointed position.

(16) The pointed position detection method may further comprises a step of performing position control of a cursor comprised within the display image, based on the detected pointed position.

This aspect of the invention enables control over the position at which a cursor is displayed, relating to the pointed position. This makes it possible for the cursor to follow the pointed position accurately during the presentation, with no erroneous recognition due to external light, thus enabling more effective presentations.

DETAILED DESCRIPTION OF THE PREFERRED EMBODIMENT

The description below relates to an embodiment of the present invention applied to a system for determining the pointed position in a presentation system, with reference to the accompanying figures.

Figure 1:
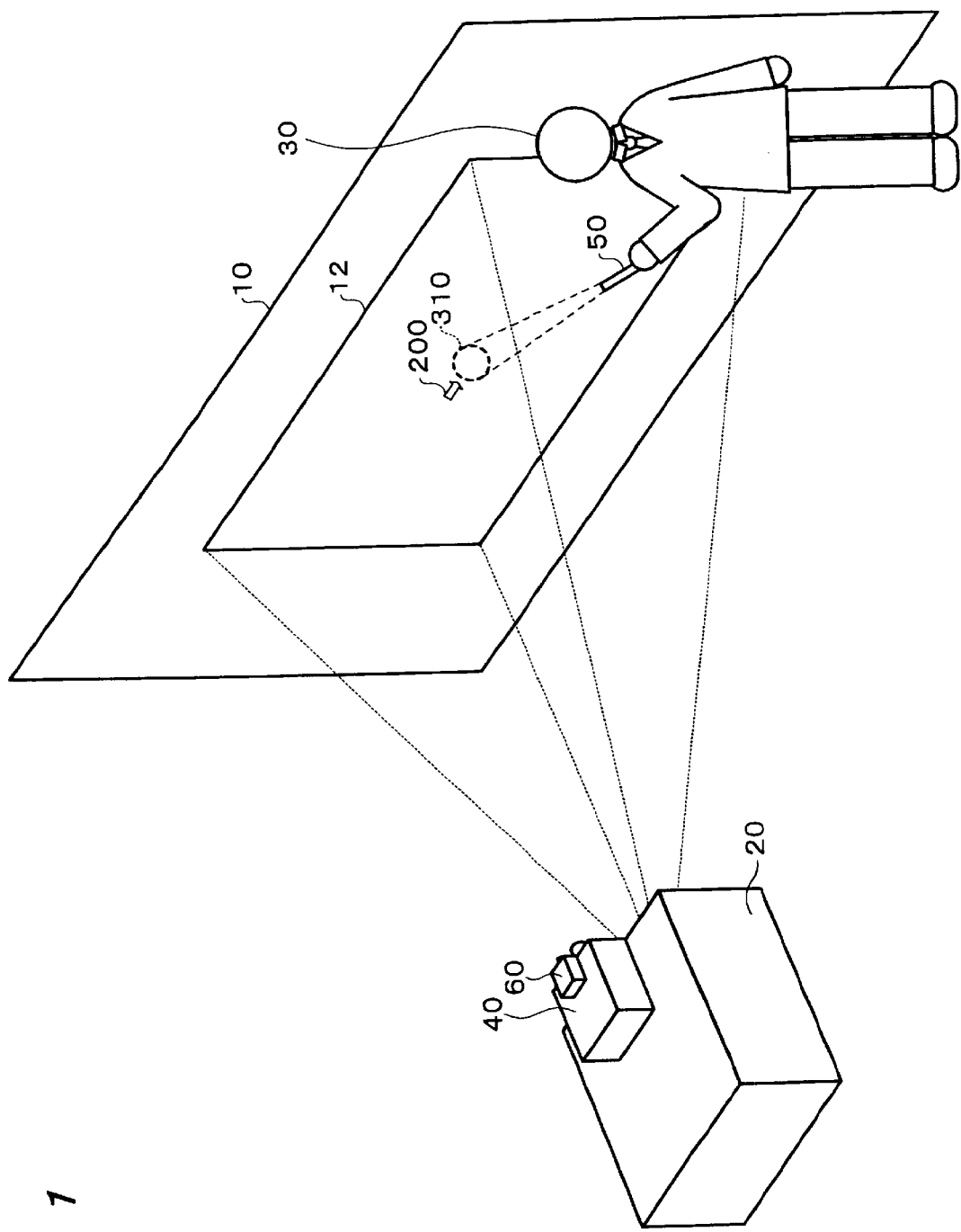
FIG. 1 is a schematic view of a presentation system of a typical embodiment of the present invention.

A schematic view of the presentation system in accordance with an example of this embodiment of the present invention is shown in FIG. 1.

FIG. 1 shows an example of a presentation system that uses a front-projection device as an image display device.

A projector 20 that is provided substantially facing a screen 10 projects an image for a predetermined presentation onto the screen 10 which is a projection surface. An image display region 12 is defined by a display image region formed by this projection of an image. A presenter 30 gives a presentation to an audience while using an infrared pointer 50 or the like to point to a desired pointed position of an image in the image display region 12.

As shown in FIG. 1, a CCD camera 40 which functions as an image pick-up means and which is provided substantially facing the image display region 12 picks up an image of the image display region 12 of the screen 10.

When giving the presentation, the presenter 30 does so while projecting a light spot 310 from the infrared pointer 50 to indicated a desired pointed position on the image display region 12 of the projected image.

The CCD camera 40 takes an image of this situation. The thus-taken image comprises the image display region 12 and the shadow and actual image of part of the presenter 30 and the infrared pointer 50.

This system performs image processing to detect the light spot 310 projected from the infrared pointer 50 of the presenter 30, from the thus-formed image. This specifies the pointed position that is the projection position of the light spot 310.

The system can also perform predetermined data processing based on this detection result. An example of such data processing is cursor control.

Figure 2:
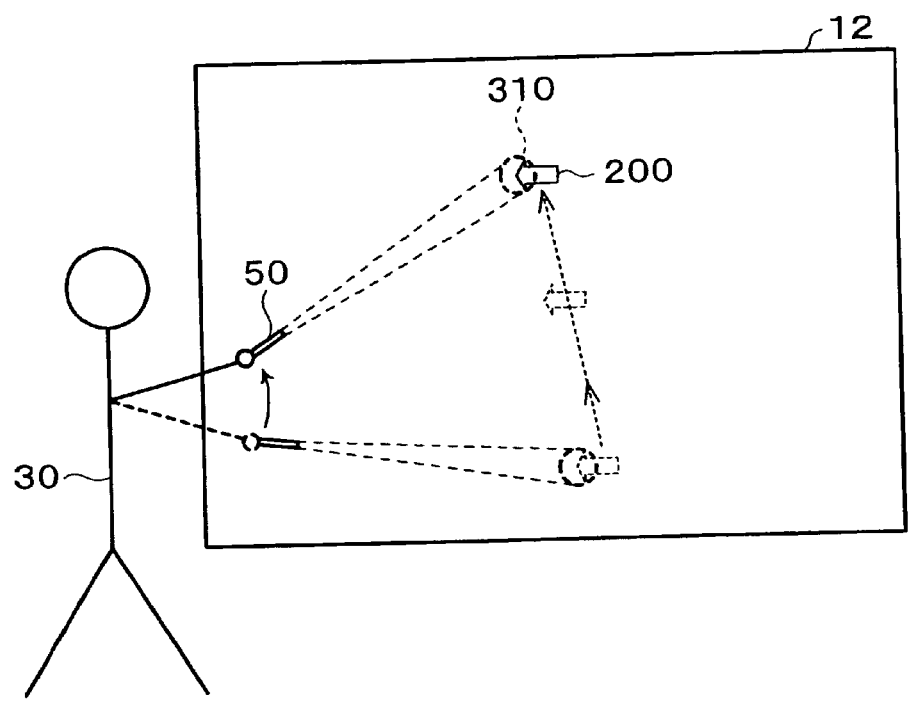
FIG. 2 is a schematic diagram of the relationship between pointed position and cursor display position.

A schematic diagram of the relationship between pointed position and cursor display position is shown in FIG. 2.

If the presenter 30 uses the infrared pointer 50 to point to a desired position on the image display region 12, as shown in FIG. 2 by way of example, a cursor 200 within the display image on the image display region 12 moves to follow the pointed position of the infrared pointer 50.

With this form of cursor control, it is necessary that the pointed position is detected accurately, to ensure that there is no discrepancy between the cursor 200 and the pointed position.

However, if the location at which the presentation is given is such that external light such as sunlight or from a remote controller that also uses infrared light is projected into the image display region 12, that light might cause incorrect recognition of the light from the infrared pointer 50 and it may not be possible to detect the pointed position accurately.

With this embodiment of the invention, the infrared pointer 50 outputs a state signal to indicate a state in which it is projecting the light spot. This system is configured to identify projection timing and detect a suitable pointed position, by the reception of that state signal by a receiver section 60 that is connected to the projector 20

The description now turns to function blocks for implementing such a system.

Figure 3:
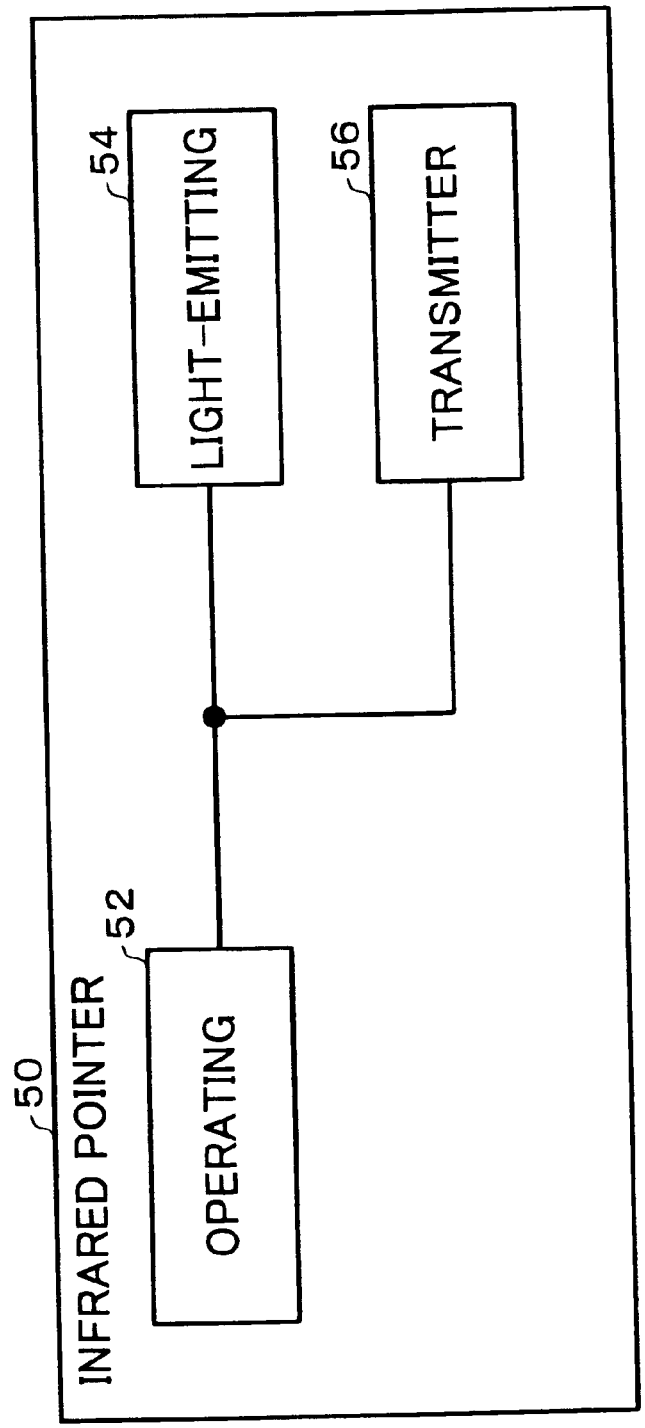
FIG. 3 is a functional block diagram of the infrared pointer in accordance with an example of this embodiment of the present invention.

A functional block diagram of the infrared pointer 50 in accordance with an example of this embodiment of the present invention is shown in FIG. 3.

The infrared pointer 50 comprises an operating section 52, a light-emitting section 54 that is a light spot projection means for projecting a light spot when the operating section 52 is operating, and a transmitter section 56 for transmitting that state signal in synchronization with the projection of that light spot.

More specifically, the operating section 52 is a switch or the like, the light-emitting section 54 is an infrared LED or the like, and the transmitter section 56 is implemented by a means of transmitting electromagnetic waves, by way of example. In this embodiment of the present invention, the transmitter section 56 comprises a device for transmitting extremely weak electromagnetic waves, which is in general use.

The light-emitting section 54 and the transmitter section 56 generate the light spot and transmit the state signal whenever the switch of the operating section 52 is pressed, but do not generate the light nor transmit the signal when the switch is not pressed.

Since the generation of the light spot and the transmission of the state signal are synchronized in this manner, the system that receives the state signal can determine that the infrared pointer 50 is currently generating the light spot, from the reception of that state signal.

The description now turns to the system that receives the state signal.

Figure 4:
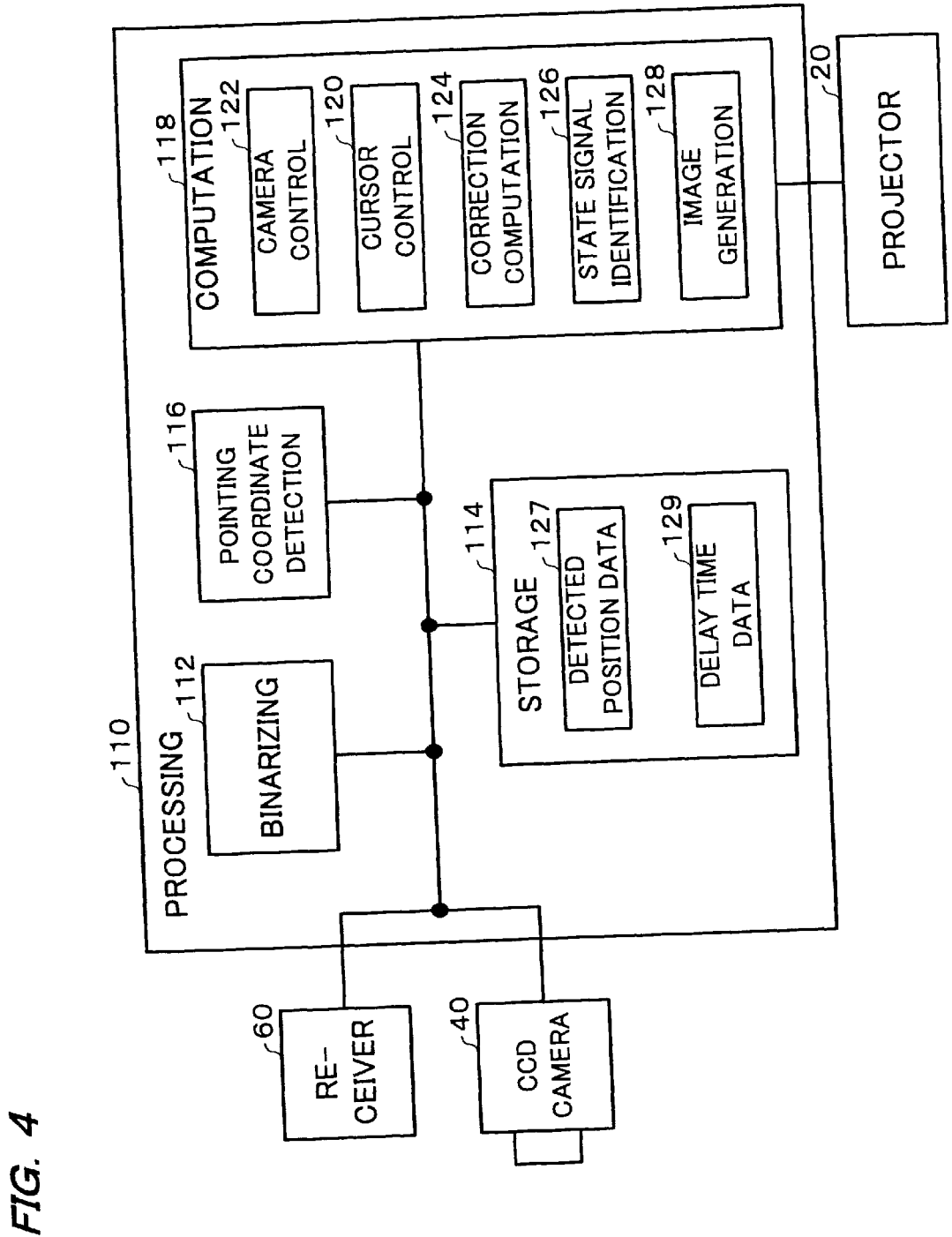
FIG. 4 is a functional block diagram of the system in accordance with an example of this embodiment of the present invention.

A functional block diagram of a system in accordance with an example of this embodiment of the invention is shown in FIG. 4.

This system comprises the receiver section 60 that receives the state signal from the infrared pointer 50, the CCD camera 40 that is the image pick-up means, a processing section 110 that performs predetermined processing that is based on an image signal and the state signal, and the projector 20.

The processing section 110 comprises a binarizing section 112, a pointing coordinate detection section 116, a computation section 118, and a storage section 114. It is preferable that this processing section 110 is implemented in a hardware manner by the use of circuitry or the like, but it could also be implemented by hardware that uses software such as programs. More specifically, the processing section 110 is implemented by using components such as a CPU, a ROM that is an information storage medium for storing various programs and data, and a RAM that functions as a work area. Details of this hardware are given later.

An image signal that is output from the CCD camera 40 is input to the binarizing section 112. In this embodiment of the invention, assume that the CCD camera 40 outputs a monochrome image signal.

In this embodiment of the present invention, the binarizing section 112 compares the image signal and a predetermined reference value Vref, then extracts a detection target that is the shadow or actual image of the pointing image from the picked-up image, and the pointing coordinate detection section 116 functions as a position detection means for detecting the pointed position.

The binarizing section 112 compares the brightness data of the image signal that is output from the CCD camera 40 and the reference value Vref and performs processing to extract the detection target of the pointing image from the image taken by the CCD camera 40. The binarizing section 112 outputs that processing data as digital image data to the pointing coordinate detection section 116.

The pointing coordinate detection section 116 extracts a lump of the detection target from the digital image data that is output from the binarizing section 112, then detects the coordinates of the center of that detection target lump by calculating the center of gravity thereof. The pointing coordinate detection section 116 takes those center coordinates as the pointed position that the infrared pointer 50 is indicating, and outputs that detection result to the computation section 118.

The computation section 118 performs various types of data processing and image processing, based on the detection data of the pointed position that is input in this manner.

Note that further details such as those of the above described binarization are disclosed in the patent literature (Japanese Patent Publication No. 11-345085) by the present applicants, so further description thereof is omitted.

In this embodiment of the present invention, the computation section 118 functions as a camera control section 122, a cursor control section 120, a correction computation section 124, and a state signal identification section 126.

The camera control section 122 performs various types of optical control such as focus control for the CCD camera 40, based on information that is output from the CCD camera 40.

The cursor control section 120 performs position control for the arrow-shaped cursor 200 that is projected for display in the image display region 12 in such a manner that it indicates the detected pointed position. In other words, the cursor control section 120 controls an image generation section 128 in such a manner that the cursor 200 that is comprised within the image projected from the projector 20 moves to follow the pointed position of the infrared pointer 50.

The receiver section 60 receives a state signal from the transmitter section 56. In this embodiment of the present invention, the transmission and reception of the state signal is done by wireless means. This makes it easy for the presenter 30 to give the presentation, because no cables or the like are used. Note that the state signal could also be transferred by cable means.

The state signal identification section 126 identifies the state signal that is sent by the transmitter section 56 of the infrared pointer 50 and received by the receiver section 60. The state signal indicates that the light spot has been generated and also comprises information for identifying the infrared pointer 50.

This enables a wide range of different types of presentation because it makes it possible to identify each pointer implement, even if one person is using a plurality of infrared pointers 50 or the like as pointer implements or two or more people are using a plurality of pointer implements.

The description now turns to pointed position detection processing, using the above described components.

Figure 5:
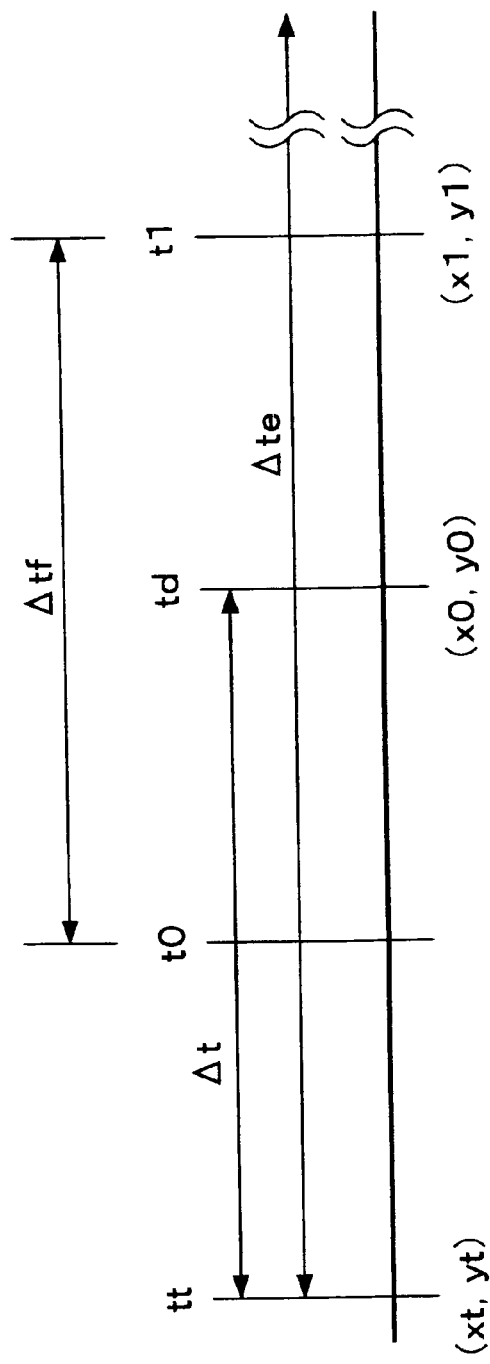
FIG. 5 is a schematic diagram of reception timing.

A schematic view of reception timing is shown in FIG. 5.

Factors that must be considered if the state signal is to be transmitted and received by wireless means, as described above, are transfer delays and processing delays.

As shown in FIG. 5, this system processes an image in frame units that are taken at times t0, t1, etc . . . , within a predetermined interval $\Delta tf$. In this case, $\Delta tf$ is the frame rate so that 30 frames are processed in one second, by way of example. This $\Delta tf$ is approximately 33 milliseconds.

For that reason, up to 33 milliseconds of discrepancy can occur with the normal detection precision, even when the pointed position is detected with the greatest precision, and thus errors can occur in the pointed position detection result if the pointed position is determined while the infrared pointer 50 is moving.

To increase the detection precision, this system performs correction calculations on the pointed position that are based on pointed position data for a plurality of detection frames.

In general, the intervals for position detection sampling depend on the frame rate, making it difficult to detect the position at intervals less than the sampling interval. This ensures that the detection of the true pointed position is based on sampling points before and after the time of the actual pointing operation, even when the pointing is done at a timing that does not match the sampling timing, thus increasing the detection precision further.

To increase the detection precision even further, it is necessary to absorb any discrepancy between the timing at which the operating section 52 is pressed and the timing at which the state signal is received.

This system stores the value of a delay time $\Delta t$ which is the total of the transfer delay time created by the discrepancy between the timing at which the operating section 52 is pressed and the timing at which the state signal is received, plus the processing delay time, as delay time data 129 in the storage section 114.

This system also stores coordinates (x0, y0), (x1, y1), etc. of the detected pointed position in each of a plurality of frames in succession as detected position data 127 in the storage section 114.

The correction computation section 124 uses the detected position data 127 and the delay time data 129 to perform correction calculations for the coordinates of the pointed position that is obtained when the state signal is identified.

This makes it possible to increase the detection precision by performing correction calculations that consider any delay between the time at which the operating section 52 is operated and the time at which the state signal is received, thus ensuring accurate position detection.

Note that $\Delta te$ in FIG. 5 denotes the period during which the infrared pointer 50 generates light. In this embodiment of the present invention, one light generation period ($\Delta te$) of the infrared pointer 50 causes the generation of light during at least two frame periods ($2\Delta tf$) of the CCD camera 40, including an allowance for the transfer delay $\Delta t$. In other words, the length of two frame periods ($2\Delta tf$) is no more than the length of one light generation period ($\Delta te$) of the infrared pointer 50.

The description now turns to the flow of coordinate correction processing.

Figure 6:
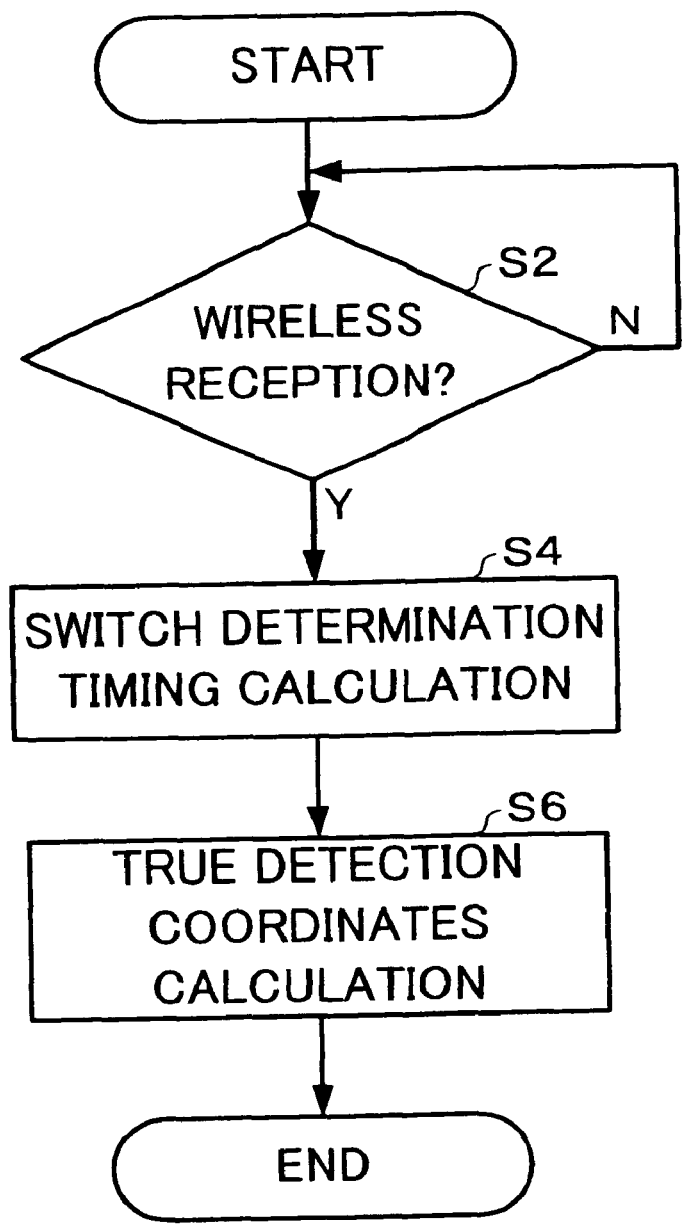
FIG. 6 is a flowchart of coordinate correction processing.

A flowchart of this coordinate correction processing is shown in FIG. 6.

First of all, the receiver section 60 receives the state signal (step S2) and the state signal identification section 126 identifies the state signal.

When state signal has been received and identified, the correction computation section 124 calculates the switch determination timing (step S4).

More specifically, the correction computation section 124 obtains the difference between a time td at which the state signal was received and identified and the delay time $\Delta t$, to obtain the time point tt at which the switch was actually pressed.

The correction computation section 124 then obtains the true coordinates (xt, yt), based on that time tt (step S6).

If the frame rate is $\Delta tf$, byway of example, xt is obtained from $\{x0+(tt-t0)*(x1-x0)/\Delta tf\}$ and yt is similarly obtained from $\{y0+(tt-t0)*(y1-y0)/\Delta tf\}$. These calculations are also performed by the correction computation section 124.

The true coordinates (xt, yt) are obtained as described above. This makes it possible to detect the pointed position in a strict fashion, enabling accurate control even when cursor control is performed.

A linear interpolation method can be used in the above described method of calculating corrections, but it is also possible to apply a curve interpolation method thereto if the pointed position moves in a curve.

Note that if there is no delay, $\Delta t=0$ so that the true coordinates (xt, yt) are obtained by a method similar to the calculation method used when there is a delay, but with tt=td.

The description now turns to the hardware configuration used to implement the above described processing section 110.

Figure 7:
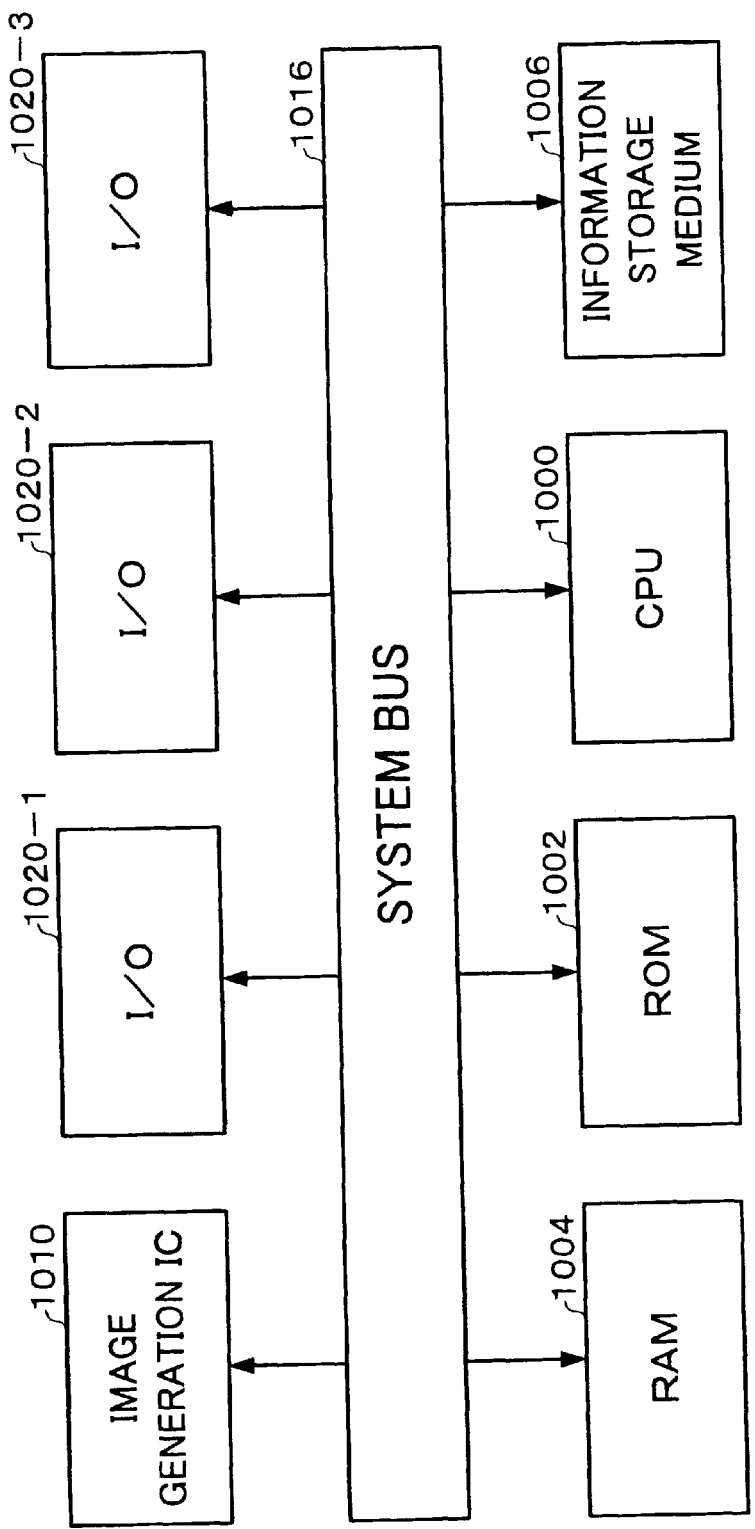
FIG. 7 is illustrative of the hardware configuration of the processing section in accordance with this embodiment of the present invention.

The hardware of the processing section 110 in accordance with an example of this embodiment of the invention is shown in FIG. 7.

In the device shown in this figure, a CPU 1000, ROM 1002, RAM 1004, an information storage medium 1006, an image generation IC 1010, and input-output (I/O) ports 1020-1, 1020-2, and 1020-3 are connected together by a system bus 1016 in such a manner that data can be mutually transferred therebetween. Components such as the CCD camera 40, the projector 20, and the receiver section 60 are connected to the I/O ports 1020-1, 1020-2, and 1020-3.

The information storage medium 1006 is used for storing a program and image data. Various means could be used as the information storage medium 1006, such as a CD-ROM, DVD-ROM, ROM, RAM, or hard disk.

The CPU 1000 controls the entire device and performs various types of data processing, in accordance with a program stored in the information storage medium 1006 and a program stored in the ROM 1002. The RAM 1004 is storage means that is used as a work area for the CPU 1000, and given contents for the information storage medium 1006 and the ROM 1002, as well as calculation results for the CPU 1000, are contained therein. A data structure having the logical configuration for implementing this embodiment of the present invention is constructed within the RAM 1002 or the information storage medium 1006.

The various processes described with reference to FIGS. 1 to 6 are implemented by the information storage medium 1006 that contains programs for performing those processes, together with components such as the CPU 1000 and the image generation IC 1010 that operate in accordance with those programs. Note that the processing performed by the image generation IC 1010 and other components could be implemented in a software manner by the CPU 1000 or an ordinary DSP or the like.

It is also possible to implement the functions of the processing section 110 by downloading programs through a network from a host machine, instead of using the information storage medium 1006. In other words, this system could be embodied by a program for implementation on a computer or by carrier waves.

The present invention has been described above with reference to a preferred embodiment thereof, but the embodiments of the present invention are not limited to the above described specific embodiment.

For example, this embodiment of the present invention was described as using a pointer that generates infrared light as the pointer implement, but it can also used for accurately detecting a pointed position caused by the operation described with reference to FIG. 5, when using a pointer that generates visible light.

In addition, the CCD camera 40, the receiver section 60, and the processing section 110 could be integrated with the projector 20.

The data processing after the detection of the pointed position is also not limited to the calculation of the display position of the cursor; it could also be changes in the display of the cursor, icon pointer determination processing, or icon display modification, by way of example.

If the configuration is such that the transmitter section 56 transmits the state signal if the operating section 52 has not operated, it is possible to make the correction computation section 124 compute the coordinates of the pointed position at the time at which the state signal is no longer received.

The present invention can also be applied to presentations and other performances that display an image by display means other than a projector means such as the above described projector. Such a display means corresponds to a wide range of display devices other than a liquid-crystal projector, such as a cathode ray tube (CRT), a plasma display panel (PDP), a field emission display (FED), an electroluminescence (EL) device, a direct-view type of liquid-crystal display device, or a digital micromirror device (DMD). Note that DMD is a trademark owned by Texas Instruments Incorporated.

In addition, although the embodiment of the present invention was described above as being applied to a front-projection type of projector, it can equally well be applied to a rear-projection type of projector.

What is claimed is:

1. A pointed position detection system which detects a position of a light spot that is projected into an image display region by using a pointer implement, the pointed position detection system comprising:

image pick-up means which picks up an image of the image display region;

position detection means which detects a pointed position of the light spot within the picked-up image display region; and receiver means which receives a state signal transmitted in from the pointer implement during a pointing operation performed by the pointer implement, the state signal indicating a state in which the pointer implement is projecting the light spot;

wherein the position detection means detects a position of the light spot as a pointed position in the image display region, based on reception timing of the state signal.

2. The pointed position detection system as defined in claim 1, wherein the position detection means performs correction calculations in the detection of the pointed position, based on pointed position data for a plurality of frames.

3. The pointed position detection system as defined in claim 1, wherein the position detection means performs correction calculations in the detection of the pointed position that are based on delay time data which indicates a delay time comprising at least one of a processing delay time and a transfer delay time up until the detection of the state signal.

4. The pointed position detection system as defined in claim 1, wherein the pointer implement comprises:

light spot projection means which projects the light spot when a predetermined operating section is operated; and transmitter means which transmits the state signal in synchronization with the projection of the light spot.

5. The pointed position detection system as defined in claim 4, wherein:

the state signal comprises an identification signal for the pointer implement; and the pointed position detection system further comprises identification means which identifies the pointer implement, based on the identification signal for the pointer implement.

6. The pointed position detection system as defined in claim 4, wherein:

the transmitter means transmits the state signal in a wireless fashion; and the receiver means receives the state signal in a wireless fashion.

7. A presentation system for performing a presentation in which a light spot is projected by a pointer implement into an image display region, the presentation system comprising:

display means which displays an image in the image display region;

the pointed position detection system as defined in claim 1; and processing means which performs processing in which a pointed position detected by the position detection means is reflected in predetermined data processing.

8. The presentation system as defined in claim 7, wherein the processing means performs position control of a cursor comprised within a display image, based on the detected pointed position.

9. A program embodied on an information storage medium or in a carrier wave for detecting a position of a light spot that is projected into an image display region by using a pointer implement, the program implementing in a computer:

position detection means which detects a pointed position of the light spot within the image display region, based on an image signal from an image pick-up means which picks up an image of the image display region; and means for causing a receiver means to receive a state signal that is transmitted in from the pointer implement during a pointing operation performed by the pointer implement, the state signal indicating a state in which the pointer implement is projecting the light spot;

wherein the position detection means detects a position of the light spot as a pointed position in the image display region, based on reception timing of the state signal.

10. The program as defined in claim 9, wherein the position detection means performs correction calculations in the detection of the pointed position, based on pointed position data for a plurality of frames.

11. The program as defined in claim 9, wherein the position detection means performs correction calculations in the detection of the pointed position that are based on delay time data which indicates a delay time comprising at least one of a processing delay time and a transfer delay time up until the detection of the state signal.

12. The program as defined in claim 9, wherein:

the state signal comprises an identification signal for the pointer implement; and the program further implements in a computer, identification means which identifies the pointer implement, based on the identification signal for the pointer implement.

13. The program as defined in claim 12, wherein the receiver means receives the state signal in a wireless fashion.

14. The program as defined in claim 9, further implementing in a computer:

means for causing an image display means to display an image in the image display region; and processing means which performs processing in which a pointed position detected by the position detection means is reflected in predetermined data processing.

15. The program as defined in claim 14, wherein the processing means performs position control of a cursor comprised within the display image, based on the detected pointed position.

16. A pointed position detection method of detecting a position of a light spot that is projected into an image display region by using a pointer implement, the method comprising:

an image picking-up step of picking up an image of the image display region;

a position detection step of detecting a pointed position of the light spot within the picked-up image display region; and a reception step of receiving a state signal transmitted in from the pointer implement during a pointing operation performed by the pointer implement, the state signal indicating a state in which the pointer implement is projecting the light spot;

wherein the position detection step detects a position of the light spot as a pointed position in the image display region, based on reception timing of the state signal.

17. The program as defined in claim 16, wherein the position detection step performs correction calculations in the detection of the pointed position, based on pointed position data for a plurality of frames.

18. The program as defined in claim 16, wherein the position detection step performs correction calculations in the detection of the pointed position that are based on delay time data which indicates a delay time comprising at least one of a processing delay time and a transfer delay time up until the detection of the state signal.

19. The program as defined in claim 16, further comprising:

a step of performing position control of a cursor comprised within the display image, based on the detected pointed position.

* * * * *